Figure 1:
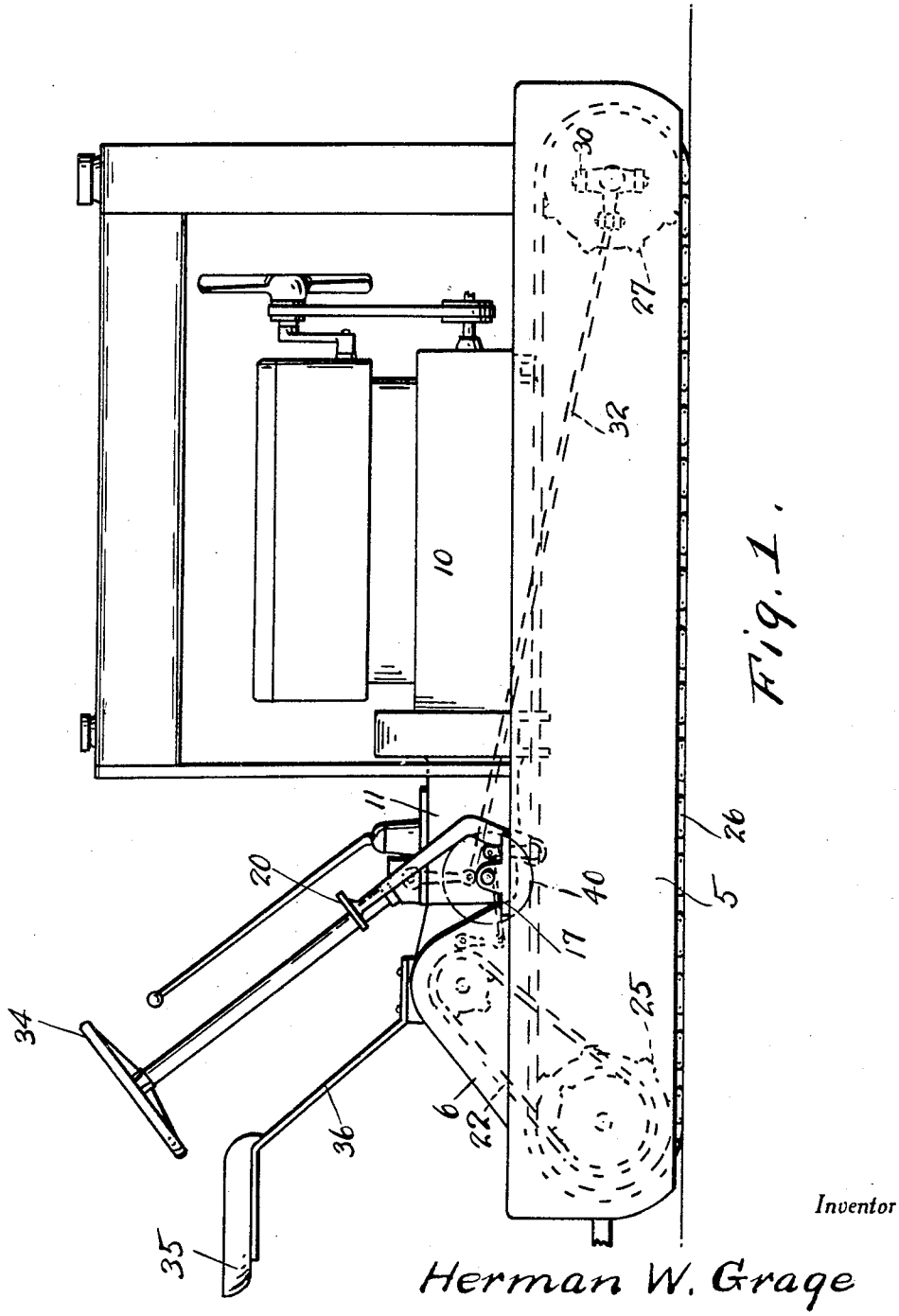

Dec. 29, 1931.   H. W. GRAGE   1,838,222
TRACTOR
Filed Nov. 24, 1930   3 Sheets-Sheet 1

Inventor
Herman W. Grage
By Clarence A. O'Brien
Attorney

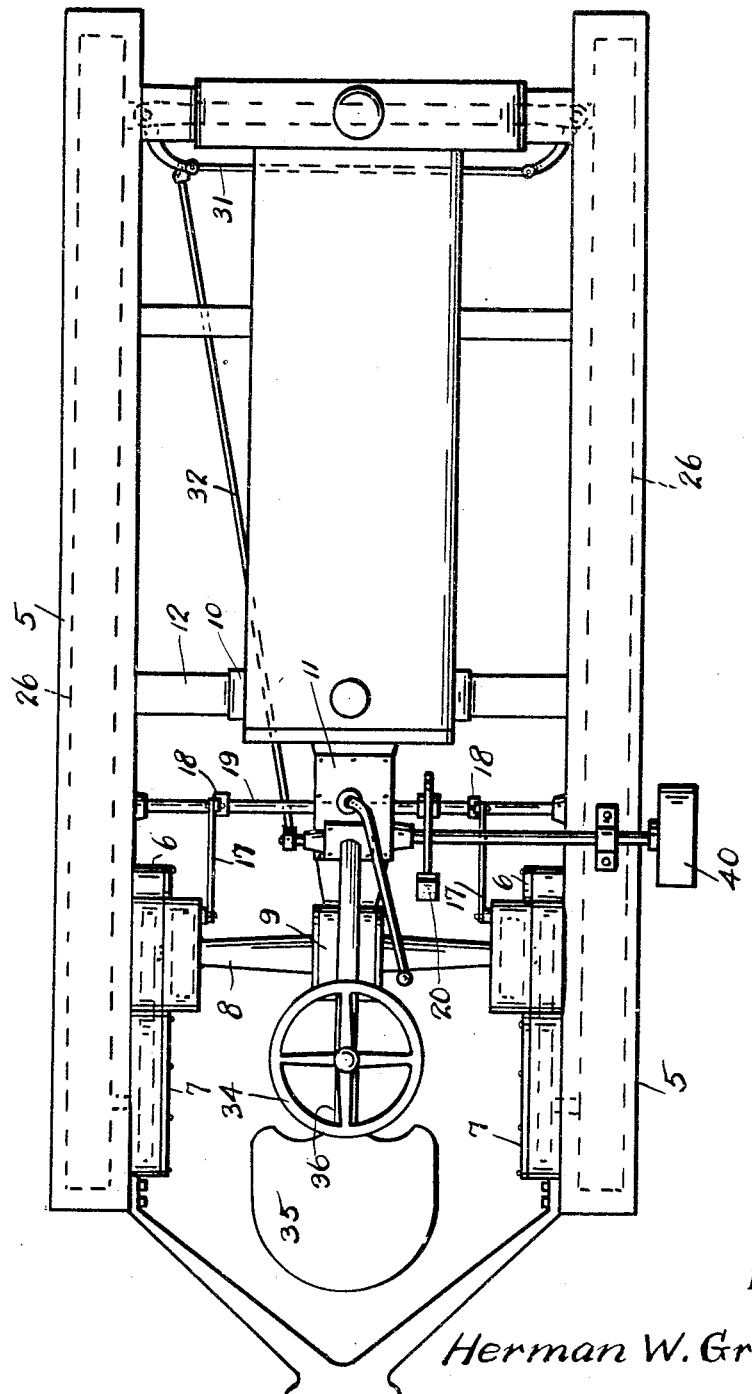

Dec. 29, 1931.  H. W. GRAGE  1,838,222
TRACTOR
Filed Nov. 24, 1930   3 Sheets-Sheet 3
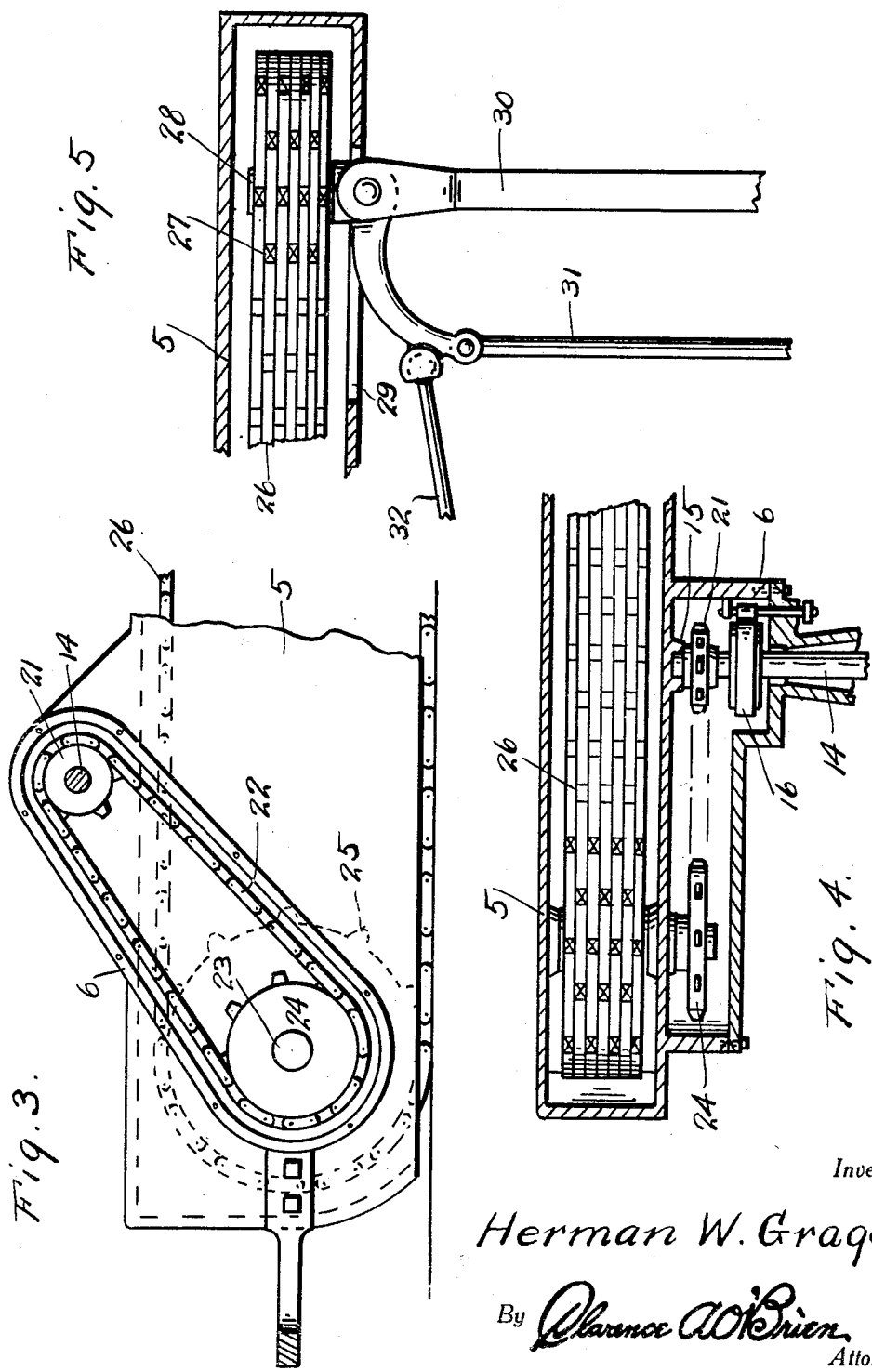
Inventor
Herman W. Grage
By Clarence A. O'Brien
Attorney Patented Dec. 29, 1931

1,838,222

UNITED STATES PATENT OFFICE

HERMAN W. GRAGE, OF MANILLA, IOWA

TRACTOR

Application filed November 24, 1930. Serial No. 497,907.

The present invention relates to a tractor and has for its prime object to provide improved traction means.

Another very important object of the invention resides in the provision of a tractor of this nature which is comparatively simple in its construction, easy to manipulate, strong and durable, compact and convenient in its arrangement of parts and well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a side elevation of a tractor embodying the features of my invention, Figure 2 is a top plan view thereof, Figure 3 is a detail vertical longitudinal section taken through one of the casings on a side housing, Figure 4 is a horizontal section therethrough, and Figure 5 is a horizontal section through the front end of one of the housings.

Referring to the drawings in detail it will be seen that the numerals 5 denote a pair of spaced parallel coextensive elongated housings which are open at the bottom only. On the rear portions and inner surfaces of the housings 5 are formed casings 6 closed by plates 7 formed integrally on axle shaft housings 8 extending outwardly from differential mechanism operatively connected with engine 10 through a suitable transmission 11. The engine 10 is mounted on cross bars or cradles 12 between the elongated side housings 5.

Numerals 14 denote axle shafts in the housings 8 and having their ends journalled in bearings 15 formed inside the casings 6. Brake mechanisms 16 are mounted on the shafts 14 within the casings 6 and are actuatable by links 17 connected with cranks 18 on a shaft 19 journalled between the side housings 5 and rockable by a brake pedal 20.

Sprockets 21 are mounted on the shaft 14 within the casings 6 and have chains 22 trained thereover.

Shafts 23 are journalled across the rear ends of the housings 5 and extend into the casings 6 and on their inner ends have sprockets 24 over which said chains 22 are trained. On each shaft 23 there are a plurality of sprockets 25 within the housing 5 and a plurality of chains 26 are trained thereover.

Chains 26 are also trained over a plurality of sprockets 27 journalled on steering knuckles 28 which extend through openings to the inside of the forward end of the housings 5, said openings being denoted by numerals 29. The steering knuckles are rockable on the ends of front axle 30. The steering knuckles are connected together by rod 31. A steering rod 32 is connected with one of the knuckles and is operatively connected in the usual known manner with the steering wheel 34 which is located to the front of a seat 35 carried by a shank 36 inclining upwardly and rearwardly from the differential housing. The sprockets 25 and 27 are of sufficient diameter so that the lower runs of the chain are disposed below the lower edges of the housing 5. To keep the tractor straight ahead it is only necessary to actuate the steering wheel 34 which will swing the steering knuckles sufficient to accomplish this without using the ordinary well known means for turning the tractor.

A power take off pulley 40 is operatively connected with the transmission mechanism 11 and extends to the outside of one of the housings 5.

It is thought that the construction, operation, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It is apparent that changes in the details of construction, and in the combination and arrangement of parts may be resorted to without departing from the spirit or scope of the invention as hereinafter claimed or sacrificing any of its advantages.

Having thus described my invention what I claim as new is:

A tractor of the class described comprising a pair of elongated parallel casings each having its bottom open, cross members connecting the casings together, a power plant supported by some of said cross members, the front part of each casing having an opening in its inner wall, a front axle having its ends extended into said openings, spindles pivotally connected to the ends of said axle and located in the casings, a plurality of sprocket wheels on each spindle, an arm extending rearwardly and connected to each spindle, steering mechanism connected with the arms, a forwardly and upwardly extending casing on the inner wall of the rear part of each casing, a shaft journalled in the rear part of each elongated casing and having one end extending into the lower end of each of the last mentioned casings, a sprocket on said end of each shaft, a plurality of sprockets on each of said shafts arranged in the elongated casing, chains passing over the sprockets last mentioned and the sprockets on the spindles, a differential, shaft housings having their inner ends connected with the differential and their outer ends connected with the upper ends of the diagonal arranged casings, shafts arranged in said housings and connected with the differential and having their inner ends journalled in the diagonal arranged casings, a socket on said outer end of each shaft, chains passing over the last mentioned sprockets and the sprockets on the inner ends of the rear shafts.

In testimony whereof I affix my signature.

HERMAN W. GRAGE.